Figure 3:
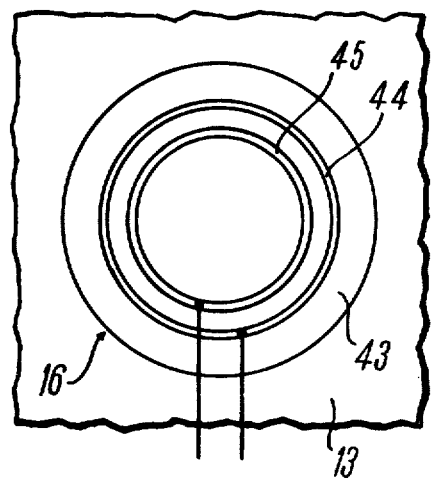

United States Patent [19]
Braun et al.

[11] 3,891,979
[45] June 24, 1975

[54] ROAD CONDITION MONITORING DEVICES

[75] Inventors: Otto Paul Braun, Freiberg; Horst Oehler, Waiblingen, both of Germany

[73] Assignee: Otto P. Braun, Germany

[22] Filed: Oct. 23, 1973

[21] Appl. No.: 408,377

[30] Foreign Application Priority Data
Nov. 7, 1972 Germany............................ 2254351

[52] U.S. Cl................................. 340/234; 340/235
[51] Int. Cl. ............................................. G08b 21/00
[58] Field of Search........................... 340/234, 235

[56] References Cited
UNITED STATES PATENTS
3,540,025  11/1970  Levin et al......................... 340/234
3,634,841  1/1972   Irvine............................. 340/235 X

*Primary Examiner*—Donald J. Yusko
*Attorney, Agent, or Firm*—Brumbaugh, Graves, Donohue & Raymond

[57] ABSTRACT

A device for detecting the danger of black ice on the roads has at least one road temperature sensor, a moisture sensor and a salinity sensor. Electrical circuitry converts the salt content of moisture on the road surface, as measured by the salinity sensor in the form of a conductivity cell, into the freezing point of the road moisture and compares this freezing point with the actual road temperature. If the latter is the lower there is a danger of black ice, unless the moisture sensor shows that the road is dry, and an audible and/or visible signal of the danger is produced. Gritting of the road can then be promptly undertaken. A second road temperature sensor can be used to switch on parts of the device when the temperature falls below a value slightly above 0°C.

18 Claims, 5 Drawing Figures

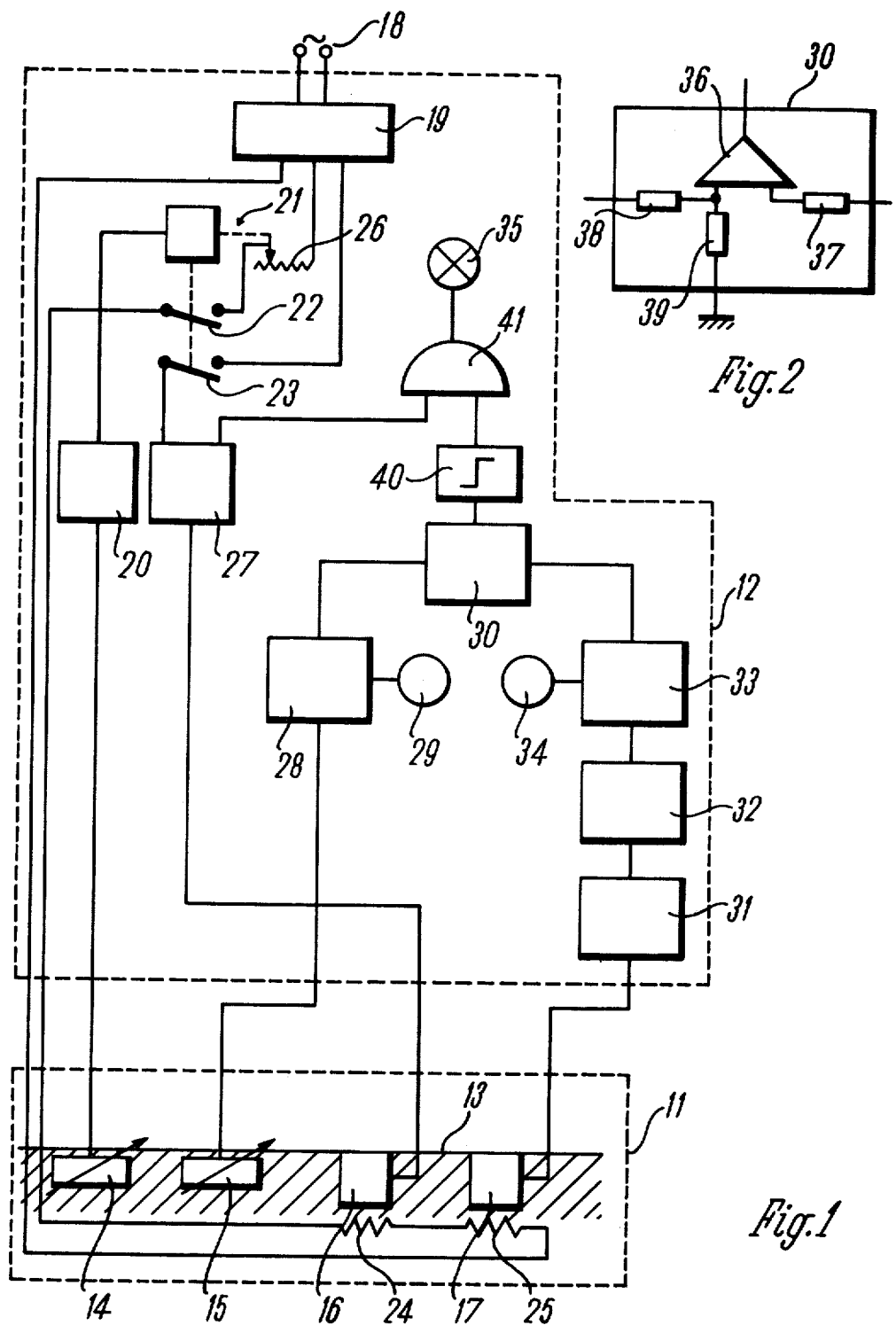

ROAD CONDITION MONITORING DEVICES

The invention relates to a device for detecting the danger of black ice on roads.

It is an acknowledged fact that the black ice which forms on roads is one of the most frequent causes of accidents in winter traffic conditions. For this reason, substance containing common salt is spread on the roads in winter so that the moisture on the roads forms a salt solution whose freezing point should lie below the prevailing temperature. Lowering of the freezing point of the salt solution is dependent upon the concentration of salt in the solution. Subsequent rainfall dilutes the salt solution so that the point is finally reached where the danger of black ice recurs. More substance must therefore be spread before this point is reached.

Until now, the authorities responsible for gritting, for example the highway departments have had to rely on guesswork. In most cases, to be safe rather than sorry, too much grit was spread so that on the one hand the gritting substance, which is not exactly inexpensive, was wasted and on the other hand the unpleasant consequences of spreading salt (increased corrosion on motor vehicles and other means of transport) were intensified. A further consideration is that spreading excessive amounts of salt does not always mean that there is some in reserve for when it rains again as it is washed away. On the other hand, if an inadequate amount is spread, there is a danger that a vehicle driver might suddenly encounter black ice.

Admittedly ice-warning devices are known which, for example, comprise an outside thermometer attached to the motor vehicle which switches on a warning light, for example, on nearing the temperature zero. These thermometers, however, only determine air temperatures and not road surface conditions and neither is the influence of the spread salt taken into account.

A feature of the invention is to provide a device for detecting the danger of black ice on roads by means of which an easily comprehensible signal is given for detecting and warning of the danger of black ice in dependence upon the actual road conditions.

In accordance with the invention, the device comprises an electrical ground temperature sensor and an electrical salt-content sensor which can be fitted or applied to the road surface and are connected to at least one indicating element for comparatively indicating the ground temperature and the freezing point, which is dependent upon the salt content, of a salt/water solution on the road surface.

The sensors of this device may, for example, be fixed in the road surface at points where the risk of black ice occurring is particularly high. The indicating element, which may for example comprise two indicating devices of which one registers the ground temperature and the other indicates the freezing point of the salt/water mixture, may on the other hand be fixed in a road maintenance vehicle. There a reading indicates when there is danger of black ice, i.e. when there is a risk of the ground temperature dropping below the freezing point of the salt/water solution. In particular, the device can detect when this danger point is near so that regritting can be undertaken in good time. If such readings are taken from various points of a district of roads, it is possible not only to avoid dangerous conditions and save on materials but also to make the most expendient use of the labour forces and equipment required for gritting. It is also advantageouly possible to make a device switchable with, in certain cases, only one indicating element for several sensors.

According to an advantageous feature of the invention, a comparator may be provided which compares a signal dependent upon the ground temperature with a signal dependent upon the salt content and when the ground temperature approaches or falls below the freezing point produces an output signal which is supplied to an indicating device. This indicating device, which may produce a visible or an audible signal, ensures that, even when black ice or the danger thereof unexpectedly occurs (for example as a result of sudden rainfall on undercooled ground), the authority responsible for gritting is immediately informed.

According to another feature of the invention the device is advantageously connected to and controls an optical warning system for the vehicle driver. Such a system may be provided, for example, on stretches of road which are particularly liable to black ice, such as on bridges, in forested areas and the like to warn the driver as he approaches of possible danger from black ice and induce him to proceed with caution. Since the particular problem arising here is one of reliable functioning, it is particularly advantageous to construct the device according to the invention in an especially simple and operationally reliable manner.

Furthermore, the device also preferably contains a moisture sensor which can be applied to the road surface and which is connected to the comparator and, if moisture is detected, prepares the comparator for transmitting the output signal to the indicating device. This prevents the warning or indicating device from being actuated when there is frost but the street is dry. In such a case there is no black ice.

The salt-content sensor and/or the moisture sensor advantageously have a heating system. This measure ensures that the sensors, which normally do not provide any indication of frozen fluid, remain operational even when the freezing point has already been passed. The heating system is preferably controllable by means of a ground temperature sensor. By "controllable," connection and disconnection and regulation of the heating system is understood. The level of heating is preferably selected so that it is just sufficient to prevent ice forming at the measuring point. However, by setting the heating suitably low it should be ensured that the moisture does not evaporate substantially more quickly than on the road surface as this would lead to faulty readings. A separate ground temperature sensor may be provided for controlling the heating.

If the sensors, as are provided according to a feature of the invention, are fixed on the road surface, they may be connected to the other parts of the device, for example the electronic amplification and the indicating elements, by cable connections. This does not present any difficulty with modern roads or motorways which mostly have a parallel cable network. However, such a cable connection could be very complicated. In such a case it is advantageously possible for signals to be radio-transmitted within the device between parts disposed at points which are spatially separated from one another. Here one can choose which signals are best suited for wireless transmission. If the sensor signals are transmitted, all that is necessary is that the sensors and the transmitter be disposed in the region of the measuring point. However, another alternative is to transmit output signals. In this case, the main part of the device is located at the measuring point and may be driven, for example, by batteries while the indicating element may be located in the operational part of the gritting lorries.

According to another feature of the invention it is also possible for the device to be combined into a portable appliance. Such an appliance may be used by the road service during a patrol to check whether there is already a need for gritting without having to wait until black ice actually occurs. Such a portable appliance can therefore be used on its own or in conjunction with fixed devices.

Figure 5:
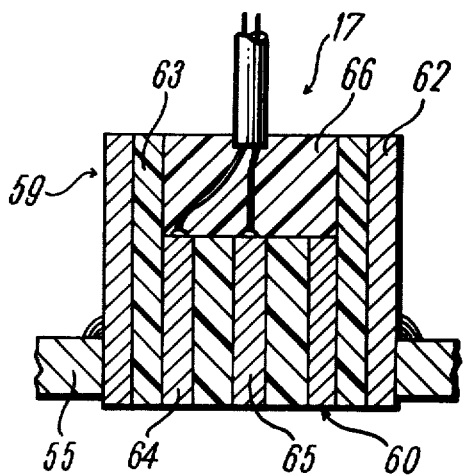
Figure 4:
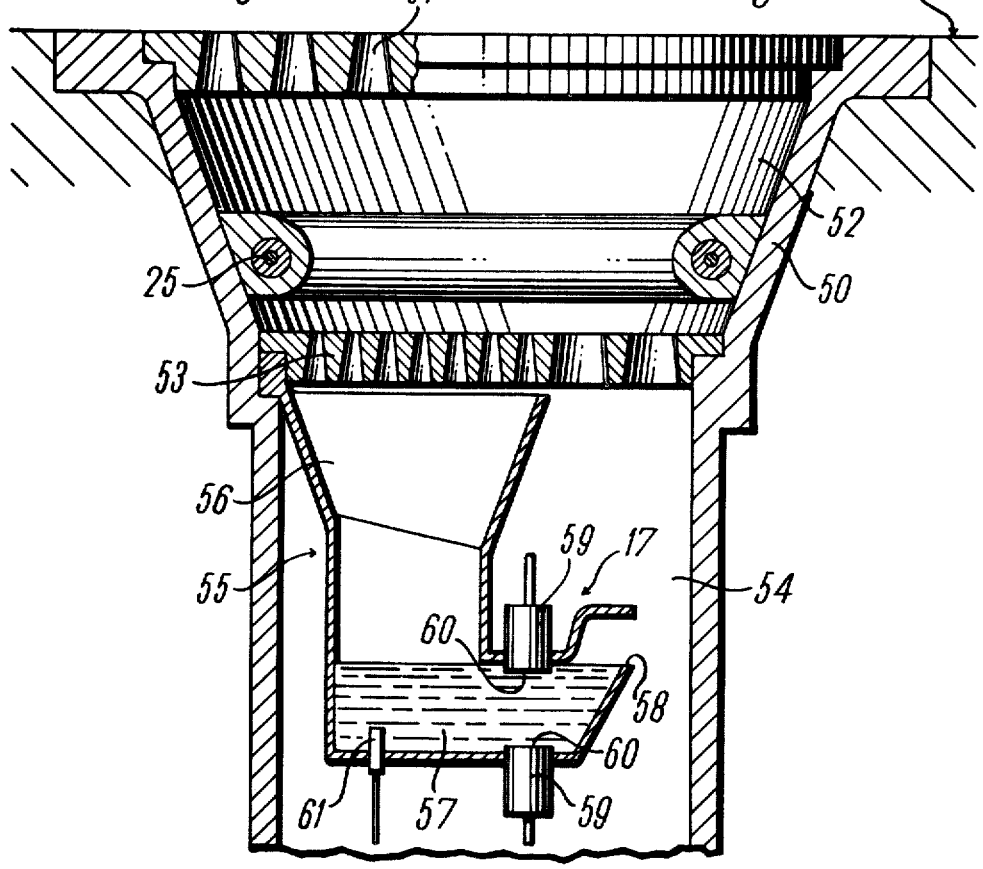

The invention is further described, by way of example, with reference to the accompanying drawings, in which:

FIG. 1 is a block circuit diagram of one embodiment of the device according to the invention, FIG. 2 is a circuit detail of the device of FIG. 1, FIG. 3 is a schematic plan view of a moisture probe, FIG. 4 is a schematic sectional view of a probe for the salt content and its installation, and FIG. 5 is a longitudinal section through an electrode element of the salt content probe.

The device illustrated diagrammatically in FIG. 1 comprises two parts, namely a sensing part 11 and an indicating part 12. In the illustrated embodiment, the sensing part 11 is firmly installed in the region of a road surface 13. The indicating part 12 is connected to the sensing part 11 by electrical lines and may be disposed, for example, in a road control unit. As already mentioned, the electrical lines may be replaced by radio links and the sensing part may alternatively under certain circumstances be movable with the indicating part 12 so that it can be placed by hand onto the road surface to indicate the prevailing road conditions.

The sensing part contains two ground temperature sensors 14, 15 a moisture sensor 16 and a salt content sensor 17. The ground temperature sensors 14, 15 may be temperature-dependent electrical resistors, for example NTC-resistors while the moisture and salt content sensors 16, 17, which are described later in greater detail, measure the current flowing between electrodes when there is moisture or water whose conductivity is increased by the salt content.

The indicating part 12 has a connection 18 to mains which supplies the entire device by way of a network 19. However, the supply to the individual parts of the device is only shown for those parts of particular interest in this case.

The output of the ground temperature sensor 14 is connected via an amplifier 20 to and thereby controls a control and regulating device 21. The device 21 has switches 22, 23. The switch 22 can place in circuit heating systems 24, 25 which are disposed on the moisture sensor 16 and the salt content sensor 17 so as to be able to heat the sensor zone sufficiently to melt ice or snow in their direct vicinity. The control and regulating device 21 also controls a regulator 26 for the heating systems 24, 25 in dependence upon the temperature at the road surface as indicated by the sensor 14. Regulation is effected in such a way that the heat produced by the heating systems 24, 25 is always just enough to keep any moisture present at the sensors 16, 17 above freezing point. The temperature is not set higher deliberately so as not to promote evaporation.

The amplifier 27 connected to the output of the moisture sensor 16 is brought into operation by way of the switch 23. The two switches 22, 23 are not closed until the freezing point of pure water is approached, for example at +2°C., so that the heating does not become effective or the moisture sensor operational until then.

The ground temperature sensor 15 is connected by way of an amplifier 28 on the one hand to an indicating device 29, for example an electrical measuring device which is calibrated in suitable temperature values, and on the other hand to a comparator 30 which is described in greater detail later. Unlike the moisture sensor 16, the salt content sensor 17 is supplied with alternating current to prevent the measurement results from being distorted by polarisation phenomena. The alternating current for the salt content sensor 17 is supplied by an oscillator 31. The current passing through the salt content sensor 17 and forming the output signal is rectified in a rectifier 32 and amplified in an amplifier 33. The output of the amplifier 33 is connected on the one hand to an indicating device 34 and on the other hand to the comparator 30. The indicating device 34 can equally well be an electrical measuring device which is calibrated in temperature values and therefore indicates the freezing points dependent upon the salt content in a manner which is immediately, i.e. without conversion of any kind, comparable with the prevailing road surface temperature indicated by the indicating device 29. The indicating devices 29, 34 together with an indicating device 35 which is described later in greater detail form the indicating part of the device.

The comparator 30, which is shown somewhat more fully in FIG. 2, contains an operational amplifier 36 to which the output signals of the amplifier 33 are supplied by way of a resistor 37 and to which the output signals of the amplifier 28 are supplied by way of a resistor 38. This input of the operational amplifier 36 is earthed by way of a further resistor 39. As a result of this, the output value of the comparator 30 becomes greater when a greater current flows through the salt content sensor 17 as the salt content increases but becomes smaller when, at an increase in the road surface temperature, the resistance of the sensor 15 is reduced. With suitable adjustment, the output value of the comparator 30 is a measure of the difference between the temperature actually prevailing at the road surface and the freezing point. This output value is supplied to a threshold value switch 40, for example a Schmitt trigger, which is triggered at a specific pre-adjusted value. The circuit is so adjusted that triggering is effected when the actual ground temperature is at a value only a few degrees above freezing point or below this value.

The threshold value switch 40 is connected to a first input of a NOR-gate 41. The output of the amplifier 27 of the moisture sensor 16 is connected to a second input. The output of the NOR-gate 41 supplies the indicating device 35 which was mentioned earlier and may be a visible or audible signal transmitter, for example an indicator lamp. As was mentioned earlier, it is alternatively possible for the indicating device 35 to take the form of a visible warning system for drivers, for example a danger sign set up at the roadside which is lit or flashes in emergencies.

The device shown in FIGS. 1 and 2 operates as follows:

When the temperature at the road surface 13 drops and falls below the value set at the control and regulating device 21, for example when the ground temperature sensor detects a temperature below +2°C., the switches 22 and 23 are closed so that the heating system 24, 25 are brought into operation, first of all in the lowest heating stage, and the moisture sensor 16 is made ready for use by switching on of its amplifier 27. It should be noted that indication of the ground temperature by means of the sensor 15 and the indicating device 29 may be permanently in operation in order to record these temperatures. The response temperature of the control and regulating device 21 can be adjustable for adaptation to different conditions.

If the temperature then drops further, this is indicated at the indicating device 29 but neither the moisture sensor nor the salt content sensor can supply a reading. The NOR-gate 41 and the threshold value switch 40 are so connected that, not only with absense of moisture in the moisture sensor 16 but also when the ground temperature is higher than the freezing point of the salt/water solution, i.e. when there is no danger, there is a 1 signal at the second and first inputs of the NOR-gate 41, respectively so that the latter has a zero output. In the described conditions (no moisture but temperatures below 0), the state at the output of the NOR-gate is therefore 0, which leads to blocking, because in this state the ground temperature is below the freezing point which, in the absence of a possible reading of the salt content sensor, is 0°C.

It is assumed that salt has not yet been spread on the road. If moisture than arises, be it in the form of hoar, snow or the like, the moisture in the region of the sensor 16 and 17 thawed by the heating system and the sensor 16 then indicates the presence of moisture. The second input of the NOR-gate 41 at the moisture side is accordingly switched to the state zero. The salt content sensor 17, however, since there is no salt present only supplies the reading "freezing point 0°C" while the ground temperature indicator 29 supplies the reading under 0°C. By means of the comparator and the Schmitt trigger, a zero is applied to the first input of the NOR-gate 41 so that the output of the NOR-gate becomes 1 and the indicating device 35 registers that there is danger of black ice. A reading indicating danger of black ice can of course easily be obtained by comparing the two indicating devices 29 and 34. The reading also shows in particular how near the prevailing outside temperature is to the freezing point or by how far it has fallen below the freezing point. Suitable measurements may then be taken and it can be determined how much salt should be added to the mixture and what quantities should be used.

If a gritting lorry has spread salt on the road surface 13, then, while the other readings are unaltered, the salt content sensor 17 indicates salinity. It is assumed that the lowering of the freezing point of the moisture by the salt is greater than the amount by which the ground temperature has fallen below zero point. This being the case, the threshold value switch 40 switches again and supplies a 1 signal to the first input of the NOR-gate so that the state 0 is produced at its output and the indicating device 35 is disconnected. The indicating devices 29 and 34 indicate that the ground temperature lies above the salty moisture freezing point. In the road control unit continuous checks can be made as to whether the lowering of the freezing point caused by the salt spreading is still sufficient. It is therefore posible to check each evening whether the difference between outside temperature and lowering of the freezing point is still so great that, in the expected weather conditions, further gritting during the night will be unnecessary. Personnel planning etc. can therefore be undertaken.

If, for example, the salt solution is diluted by another snowfall to the extent that the moisture freezing point wanders upwards again, the device again comes into the range in which a black ice warning is produced.

It is apparent that the device reliably detects dangerous conditions and facilitates the task of the authorities responsible for gritting roads, which may lead to considerable economies as regards the materials to be spread and easier conditions for personnel.

FIG. 3 shows a moisture sensor 16 which can be used in the device according to the invention. It comprises an insulator 43 which is embedded in the road surface 13 and on whose surface two annular electrodes 44, 45 are disposed concentrically relative to one another. These electrodes, as is indicated diagrammatically, are connected to a source of voltage. When there is moisture on the surface of the insulator 43, a current flows between the two electrodes 44, 45 and indicates the presence of moisture.

FIGS. 4 and 5 show a particularly advantageous embodiment of a salt content sensor 17 and its installation in a drain 50. The drain 50 is a conventional so-called "bridge drain," i.e. a gully-like drain to be disposed in the road flush with the road surface 13 and constructed and disposed so as to draw water from the road surface into a sewerage system or the like.

The drain illustrated diagrammatically in FIG. 4 has a cast housing which widens in a funnel-shaped manner in the region of the road surface 13 and there has a very strong and relatively coarse grid 51 which is capable of withstanding the great strain of the traffic passing over it. The heating system 25 of the salt content sensor, whose function was described earlier, is disposed in the inlet funnel 52. At this point it ensures that the inlet funnel is always free of ice but does not promote evaporation and thus concentration of the salt solution. The heating system comprises an embedded heating element similar to an electric tubular heating element.

Disposed at the end of the inlet funnel 52 is a second grid or screen 53 which is relatively fine in one region (lefthand side in FIG. 4) and retains larger particles of dirt. On the other hand, the right side in FIG. 4 has relatively large openings so that larger particles can pass through without affecting the working of the salt content sensor.

An insert 55 is suspended in a drain pipe 54 below the screen 53 and has a funnel-shaped inlet part 56 and, in its lower part, a chamber 57 in the form of a collecting bath in which the salt solution can be collected and having an overflow 58. The chamber 57 is protected from the penetration of dirt by the screen 53 and a cover for the overflow. The chamber may also be constructed so that dirt is easily rinsed away.

The salt content sensor 17 in the form of two electrode units 59 is disposed in the chamber or on the outer walls of the chamber. The electrode units are disposed on the upper and the lower wall portions of the chamber 57 so that their electrode surfaces 60 are located just below the surface of the salt solution which is determined by the overflow 58.

The chamber 57 may also contain a temperautre sensor 61 which may, for example, take the form of an NTC-resistor. The drain pipe 54 is connected to a pipe line which leads into sewers or conveys the water below the road surface.

FIG. 5 shows one of the electrode units 59 of the salt content sensor 17. An annular electrode 64 and a central electrode 65 are disposed concentrically and embedded in synthetic material 63 in a metal tube 62 which is welded into the wall of the insert 55. The annular electrode is in the form of a tube and the central electrode in the form of a rod, of which only the end faces 60 are exposed. They are connected to separate lead wires which are embedded in sealing compound 66 and lead out of the electrode unit.

It can be seen that the salt content sensor 17 contains two electrode units 59 which lie opposite one another in the chamber 57 and in turn each contain two electrodes. Of the four electrodes, two are connected to the oscillator 31 while the other two electrodes bypass the oscillator and are directly associated with the rectifier and the amplifier. An even better measuring accuracy can thereby be achieved.

The temperature sensor 61 also helps to increase measuring accuracy by making it possible by means of a corresponding compensation circuit to counterbalance a temperature dependence of the measuring accuracy of the salt content measuring.

Numerous modifications to this embodiment are possible. For example, the two electrode units 59 may be disposed horizontally opposite or adjacent to one another. However, possible stratification is best detected in the manner described. At any rate, care should be taken that the electrodes are not just covered by a thin film, as is perfectly sufficient for the moisture sensor, but that there is a definiate quantity of liquid between the two electrodes. If there is too little liquid there, the salt content sensor switches itself off because the upper electrode 59 is no longer reached by the fluid. This is not a serious fault as this breakdown influences the readings towards the safe side. It may possibly happen therefore that the indicator responds too early since it registers a zero salt content.

It was mentioned earlier that measuring values can be relayed by radio if cable runs are not to be used. It is however alternatively possible and advantageous for signals of the indicating device 35 which are evaluated in the device to be supplied to a transmitter which is part of a so-called "radio alarm system." The receivers of this system may, if the transmitter is located for example in the road control unit, be disposed in the competent police stations and in the homes or vehicles of the persons responsible for gritting. In systems which evaluate the readings of several stretches of road, a code can be given with the signals so that the road services vehicles may be directed to the correct locality.

We claim:

1. A device for detecting the danger of ice or snow on roads, comprising an electrical ground temperature sensor, an electrical salt content sensor, said sensors being adapted to be applied to the road surface, means connected to said sensors for comparing the ground temperature with the freezing point of the particular salt soluton present, and means for producing a warning signal when the ground temperature approaches the freezing point of the solution on the road surface.

2. The device of claim 1 further comprising means for indicating the ground temperature.

3. A device according to claim 1, in which said warning signal is a visible warning signal for vehicle drivers.

4. A device according to claim 1, which further comprises a moisture sensor which is adapted to be applied to the road surface and which is connected to a logical gate to provide said warning signal only in the presence of moisture.

5. A device according to claim 1, in which at least one of said sensors has a heating system.

6. A device according to claim 5, in which the heating system is controllable by means of said electrical ground temperature sensor.

7. A device according to claim 5 further comprising a second electrical ground temperature sensor for controlling said heating system.

8. The device of claim 1 further comprising means for indicating the freezing temperature of the particular salt solution present.

9. A device according to claim 1 including radio means for transmitting signals between parts of the device which are disposed at points spatially separated from one another.

10. A device according to claim 1 in which said electrical salt content sensor includes a chamber adapted to be filled with salt solution from the road surface and at least a pair of electrodes vertically disposed in said chamber.

11. A device according to claim 10, in which said chamber has an overflow located above the uppermost one of said electrodes.

12. A device according to claim 10 in which said salt content sensor includes two separate electrode units, said electrodes of the salt content sensor being disposed in said separate electrode units.

13. A device according to claim 12, in which said two electrode units are identical.

14. A device according to claim 12, in which an alternating current source for said salt content sensor is provided and in which each of said electrode units contains two said electrodes of which one is connected to said alternating current source, the output signal of the salt content sensor being present at the other electrode.

15. A device according to claim 10 which further comprises a temperature sensor disposed in said chamber and adapted to compensate for the influence of the temperature of the salt solution upon the conductivity thereof.

16. A device according to claim 1, which further comprises a collecting bath, said bath having an overflow and defining a chamber to be filled with salt solution and in which said electrical salt content probe includes at least a pair of electrodes disposed in said chamber.

17. A device according to claim 16, further comprising means for flushing the chamber by the liquid running into the chamber.

18. A device according to claim 1 in which the warning signal is provided by alarm means and a transmitter whose signal serves to trigger said alarm means.

* * * * *